(12) United States Patent
Stock

(10) Patent No.: US 7,445,714 B2
(45) Date of Patent: Nov. 4, 2008

(54) BIOLOGICAL PROCESSING OF ANIMAL WASTE

(76) Inventor: Raymond W. Stock, 4273 W. Queen's Ferry Dr., South Jordan, UT (US) 84095

( * ) Notice: Subject to any disclaimer, the term of this patent is extended or adjusted under 35 U.S.C. 154(b) by 207 days.

(21) Appl. No.: 11/051,683

(22) Filed: Feb. 4, 2005

(65) Prior Publication Data
US 2005/0242025 A1 Nov. 3, 2005

Related U.S. Application Data

(60) Provisional application No. 60/566,893, filed on Apr. 29, 2004.

(51) Int. Cl.
C02F 3/00 (2006.01)

(52) U.S. Cl. .................... 210/610; 210/611; 210/620; 210/629

(58) Field of Classification Search ......... 210/610–611, 210/620, 629
See application file for complete search history.

(56) References Cited

U.S. PATENT DOCUMENTS

| | | | |
|---|---|---|---|
| 3,652,406 A | 3/1972 | Westberg | |
| 4,321,142 A | 3/1982 | Starr | |
| RE31,924 E | 6/1985 | Starr | |
| 4,861,721 A | 8/1989 | Waterbury et al. | |
| 4,900,824 A * | 2/1990 | Dandliker et al. | 544/185 |
| 4,997,849 A * | 3/1991 | Petuch et al. | 514/460 |
| 5,342,524 A | 8/1994 | Gaddy | |
| 5,624,565 A | 4/1997 | Lefevre et al. | |
| 5,709,796 A | 1/1998 | Fuqua et al. | |
| 5,846,425 A | 12/1998 | Whiteman | |
| 6,039,874 A | 3/2000 | Teran et al. | |
| 6,348,147 B1 | 2/2002 | Long | |
| 6,395,174 B1 | 5/2002 | Teran et al. | |
| 6,410,305 B1 | 6/2002 | Miller et al. | |
| 6,434,884 B1 | 8/2002 | Hartung | |
| 6,599,424 B1 | 7/2003 | Teran et al. | |
| 6,982,032 B2 * | 1/2006 | Shaffer et al. | 210/101 |
| 2002/0179525 A1* | 12/2002 | Shaffer et al. | 210/610 |
| 2004/0005578 A1* | 1/2004 | Yamada et al. | 435/6 |
| 2004/0182780 A1 | 9/2004 | Lee | |

* cited by examiner

Primary Examiner—Chester T Barry
(74) Attorney, Agent, or Firm—Advantia Law Group; Michael W. Starkweather; Jason P. Webb

(57) ABSTRACT

There is a biological composition and method of use. Included is a microorganism quantity, and a nutrient quantity which may have a supplement, a short-term nutrient and a long term nutrient. The composition may be applied to a container having water wherein the microorganisms rapidly reproduce. As the microorganisms reproduce they may be extracted. Once extracted, they may be introduced into a cleaning system and dispersed to surfaces of an animal production facility. There, the microorganisms may process animal waste and the slime associated thereto. Further, the microorganisms may flow into a lagoon to beneficially participate in waste processing. Still further, the microorganisms may enhance the ability of the lagoon to prepare the waste for distribution to plants.

15 Claims, 3 Drawing Sheets

BIOLOGICAL PROCESSING OF ANIMAL WASTE

This invention claims priority, under 35 U.S.C. § 119, to the U.S. Provisional Patent Application No. 60/566,893 to Raymond Stock filed on Apr. 29, 2004, which is incorporated by reference herein. This application is co-pending with the application titled "Biological Composition for Enhancing Vegetation Growth" Attorney Docket Number 3188.2.2 NP by Raymond Stock and filed on Jan. 13, 2005.

BACKGROUND OF THE INVENTION

1. Field of the Invention

The present invention relates to biological compositions, specifically to biological compositions for treating animal waste, such as in and near animal waste lagoons.

2. Description of the Related Art

Over the past decades there has been a shift from smaller localized family farms toward larger integrated confinement agricultural operations. Specifically, large agricultural operations referred to as concentrated animal feeding operations (CAFO's) may utilize confinement barns to house a large number of livestock such as swine, poultry or dairy cows. Using the swine industry as an example, often numerous hog-confinement operations are grouped in close proximity forming "mega-farms" which may house tens of thousands of hogs. Similarly, the dairy industry operates using large factory farms that house thousands of animals in a relatively small land area. While these larger agricultural operations have numerous advantages, attendant with these larger facilities are pollution problems relating to the handling and treatment of manure and wastewater (hereinafter collectively "wastewater"). By way of example, pollution problems associated with liquid animal waste, such as produced by the swine industry, include nitrogen, phosphorus, solids, bacteria and foul odors that result from anaerobic digestion. Environmental concerns more specifically center on odor and ground and surface water quality issue and impacts.

Traditionally, animal wastes and wastewater are collected and stored in waste treatment lagoons or waste storage ponds where they undergoes minimal treatment. Most agricultural facilities use microbial digestion for treatment of animal wastes and wastewater. The primary reasons for using microbial digestion is simplicity and cost. Wastewater is simply discharged from the animal storage facility into an open lagoon or plurality of lagoons (ponds used to store and treat thousands to millions of gallons of animal waste) where the waste undergoes natural microbial digestion. After retention in the lagoon system, wastewater is usually land applied via spray irrigation. However, over forty (40) noxious gases may be emitted from lagoons at hog and/or dairy farms including ammonia, methane and hydrogen sulfide. Additionally, the time required for digestion of the organic wastes is relatively long, from weeks to months. Some current regulations require a minimum residence of 180 days for animal waste facilities using anaerobic lagoons for digestion. Neighbors find odors emanating from lagoons, confinement houses, and fields onto which wastes are sprayed to be a nuisance. In fact, as a result of odor problems associated with anaerobic lagoons, certain states have legally mandated buffer zones or designated land areas between lagoon sites and populated areas.

The lagoons may be aerobic, anaerobic, or a combination. Anaerobic lagoons, or those requiring the exclusion of oxygen, are good at breaking down solids. However, they are also septic, and emit a very strong odor. Aerobic lagoons, or those requiring oxygen, if operating properly, do a more complete job than anaerobic lagoons of breaking down solids and keep them in suspension longer so there is less residue in the lagoon; harsh odors are also reduced drastically. Further, aerobic digestion is typically quicker than anaerobic.

Most dairy lagoons are not designed to be either anaerobic nor aerobic, they are mainly a storage unit, the top 3 to 6 feet being naturally aerobic because of wind and exposed surface area, while 6 feet and below is more anaerobic due to lack of oxygen. Where both the aerobic and anaerobic populations are healthy, strong, and comprising microorganisms able to process animal waste, the animal waste may be processed very quickly as the aerobic and anaerobic populations may interact in ways which enhance the effectiveness and/or efficiency of the lagoon.

Dairymen spend considerable funds each year putting in aerators and circulators to get air into the lagoons, as well as drudging out the solids that accumulate on the bottom of the lagoon. Some dairies, due to lack of space, have smaller lagoons. In such cases maintenance costs increase significantly. The dairy may end up drudging every three to four years at thousands of dollars every time. Further, because of chemicals used on dairies in animal production, for example chemicals used in foot baths, often this residue is too toxic to be applied to fields without further processing.

Additionally, production areas such as dairy parlors accumulate animal waste during use. While the waste may be moved out of the production area, for example wherein the waste is sprayed with water and allowed to flow out of the production area and into a lagoon, it is typical for a slime to accumulate in the production areas. The slime increases the difficulty of maintaining a clean environment inside the production area, thereby increasing the risk of infection for animals. Further, where the slime accumulates on a floor, the floor may become dangerously slippery. Still further, the slime may generate offensive odors.

While microorganisms may be introduced into production areas and lagoons in various ways, it is expensive to purchase, transport and apply such bacteria. In particular where there is a need for a regular supply of the microorganisms to be used in an ongoing operation. Additionally, while the natural micro-flora found in and around production areas and lagoons is capable of processing agricultural waste, such micro-flora typically processes the material very slowly and with undesired by-products.

As such, improvements in nutrient rich compositions used generate to large amounts of desired microorganisms, which microorganisms are used to process animal waste and the manufacturing and methods thereof continue to be sought.

SUMMARY OF THE INVENTION

The present invention has been developed in response to the present state of the art, and in particular, in response to the problems and needs in the art that have not yet been fully solved. Accordingly, the present invention has been developed to provide a biological composition and methods of use thereof for use in processing animal waste, such as in and/or near animal waste lagoons.

In one embodiment, there is a biological composition for processing animal waste. The biological composition may include a microorganism quantity and a nutrient quantity. The microorganism quantity may have at least a first generation of microorganisms characterized by an ability to process animal waste. The nutrient quantity may be in an amount sufficient to sustain reproduction of the microorganism quantity for a reproduction period.

The nutrient quantity may include a supplement quantity, preferably in an amount sufficient to nourish the microorganism quantity for the reproduction period; a short-term nutrient quantity, preferably in an amount sufficient to sustain initial reproduction of at least the first generation of microorganisms and at least a subsequent generation of microorganisms, for an initial portion of the reproduction period; and a long-term nutrient quantity, preferably having a longer period of consumption by the microorganism quantity than the short-term nutrient quantity, preferably in an amount sufficient to sustain continued reproduction of at least a continuing generation of microorganisms and until the expiration of the reproduction period.

In another embodiment, the microorganism quantity may include a microorganism type selected from the group consisting of bacillus subtilis, bacillus lichenformis, bacillus cereus, bacillus megaterium, fluorescent pseudomonas, azobacter, cellulase enzyme producing bacteria, yeasts, and subcultures thereof.

In yet another embodiment, the supplement quantity may be selected from the group consisting of vitamins, inorganic salts, amino acids, growth media, minerals, humates, humic acids, enzymes, chelating agents, complexing agents, and sequestering agents.

In still yet another embodiment, the short-term nutrient quantity may be selected from the group consisting of hydrolyzed collagen, bone meal, blood meal, carbon skeleton molecules, sugars, carbohydrates, folvic acid, organic acid, soy protein, peptone treated biological matter, and combinations thereof.

In still another embodiment, the long-term nutrient quantity may be selected from the group consisting of wheat starch, soy flour, molasses, raw biological matter, and processed biological matter.

In another embodiment, the microorganism quantity may be from about 5% to about 35% of the biological composition by volume, wherein the nutrient quantity may be from 75% to 95% of the biological composition by volume and wherein the supplement quantity may be from more than 0% to about 5%, the short-term nutrient quantity may be from about 65% to about 95%, and the long-term nutrient quantity may be from more than 0% to about 35% of the biological composition by volume.

In still another embodiment, the microorganism quantity may be characterized by an ability selected from the group consisting of an ability to process nitrogen containing compounds, process phosphorous containing compounds, remove disease-causing organisms from water, facilitate delivery of oxygen to water, convert solid waste to liquid, and benefit any organism characterized by an ability to process nitrogen containing compounds, process phosphorous containing compounds, remove disease-causing organisms from water, facilitate delivery of oxygen to water, and convert solid waste to liquid. The microorganism may be further characterized by an ability to enhance vegetation growth.

There is another embodiment wherein there is a method of growing microorganisms for processing animal waste. The method may include providing a container; providing a liquid mixture within the container; introducing oxygen into the liquid mixture; and circulating the liquid mixture. The microorganism quantity may be characterized by an ability to process animal waste.

In another embodiment, the microorganism quantity may include a microorganism type selected from the group consisting of bacillus subtilis, bacillus lichenformis, bacillus cereus, bacillus megaterium, fluorescent pseudomonas, azobacter, cellulase enzyme producing bacteria, yeasts, and subcultures thereof.

In still another embodiment, the nutrient quantity may include a short-term nutrient quantity and a supplement quantity. Further, the nutrient quantity may include a long-term nutrient quantity.

In still yet another embodiment, extracting liquid mixture portions from the container may be at an average rate not significantly greater than an average regenerative rate of the liquid mixture.

In another embodiment, there may be a method for treating an animal production facility. The method may include providing a container; providing a liquid mixture within the container, wherein the liquid mixture may include a water quantity, a microorganism quantity characterized by an ability to process animal waste and a nutrient quantity; introducing oxygen into the liquid mixture; circulating the liquid mixture; extracting a liquid mixture portion from the container; introducing the liquid mixture portion into water in a cleaning system configured to apply fluid to surfaces of an animal production facility; and applying the combined liquid mixture portion and water to surfaces of an animal production facility.

In another embodiment, the liquid mixture portion may be extracted from the container at an average rate not significantly greater than an average regenerative rate of the liquid mixture.

In still another embodiment, application of the combined liquid mixture portion and water to surfaces of an animal production facility may be repeated as needed to clean the surfaces of the animal production facility.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
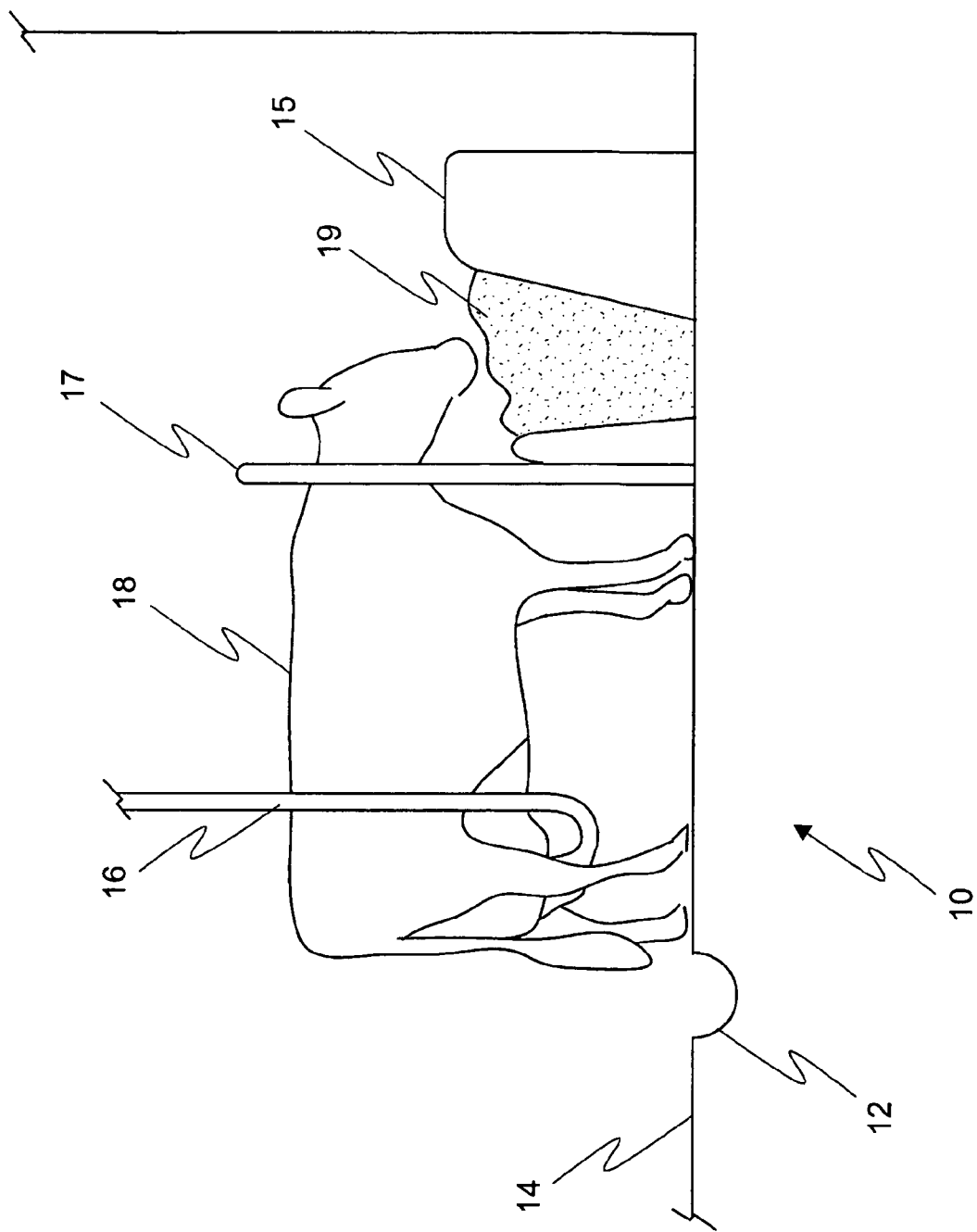
FIG. 1 illustrates a side view of a dairy cow in a stall in a dairy milking parlor according to one embodiment of the invention.

For the purposes of promoting an understanding of the principles of the invention, reference will now be made to the exemplary embodiments illustrated in the drawings, and specific language will be used to describe the same. It will, nevertheless, be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or quantity parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at or near the beginning of every sentence herein where logically possible and appropriate.

Within this specification, including the claims, the phrase "first generation of microorganisms," and the like, is defined to include the entire set of microorganisms initially present in the biological composition when the biological composition is first put to use as described in the specification, including those that may be reproductive descendants of others present within the biological composition at the same time.

Within this specification, including the claims, the phrase "subsequent generation of microorganisms" and the like is defined to include a generation of microorganisms which are reproductive descendants, whether immediate or not, of the first generation of microorganisms.

Within this specification, including the claims, the phrase "continuing generation of microorganisms," and the like, is defined to include a generation of microorganisms which are reproductive descendants, whether immediate or not, of the subsequent generation of microorganisms.

Within this specification, including the claims, the phrase "microorganism quantity" is defined to include the microorganisms of the biological composition, including all reproductive descendants. Further it includes any and all other material which may be present with the microorganisms as they are mixed together with other materials to form the biological composition. These materials may include inert carrier materials as well as any other materials.

Within this specification, including the claims, the term "animal waste," and the like, is defined to include all waste associated with animal production.

Figure 2:
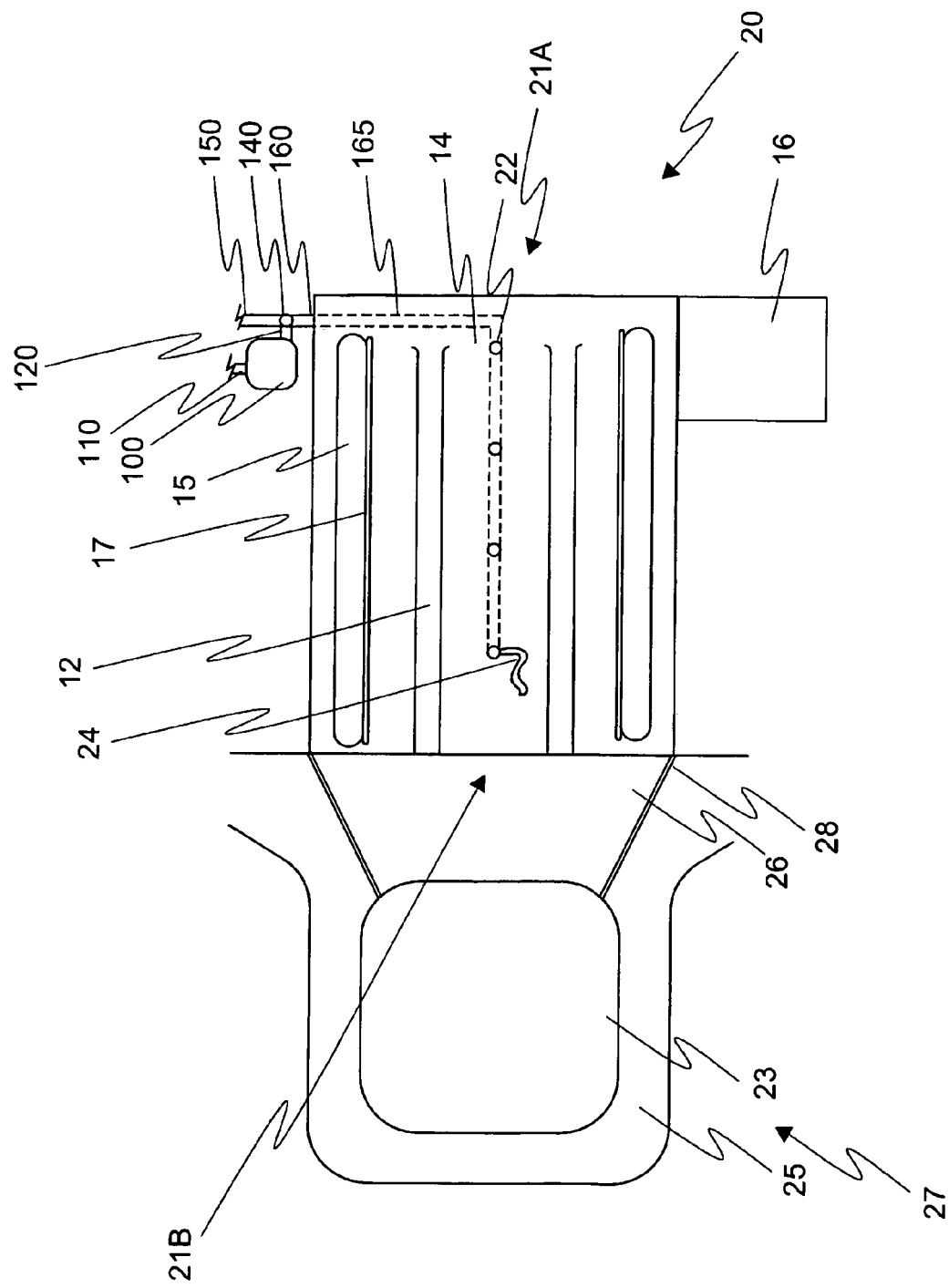
FIG. 2 illustrates a planar top view of a system configured to introduce microorganisms into a dairy milking parlor and accompanying lagoon according to one embodiment of the invention.
Figure 3:
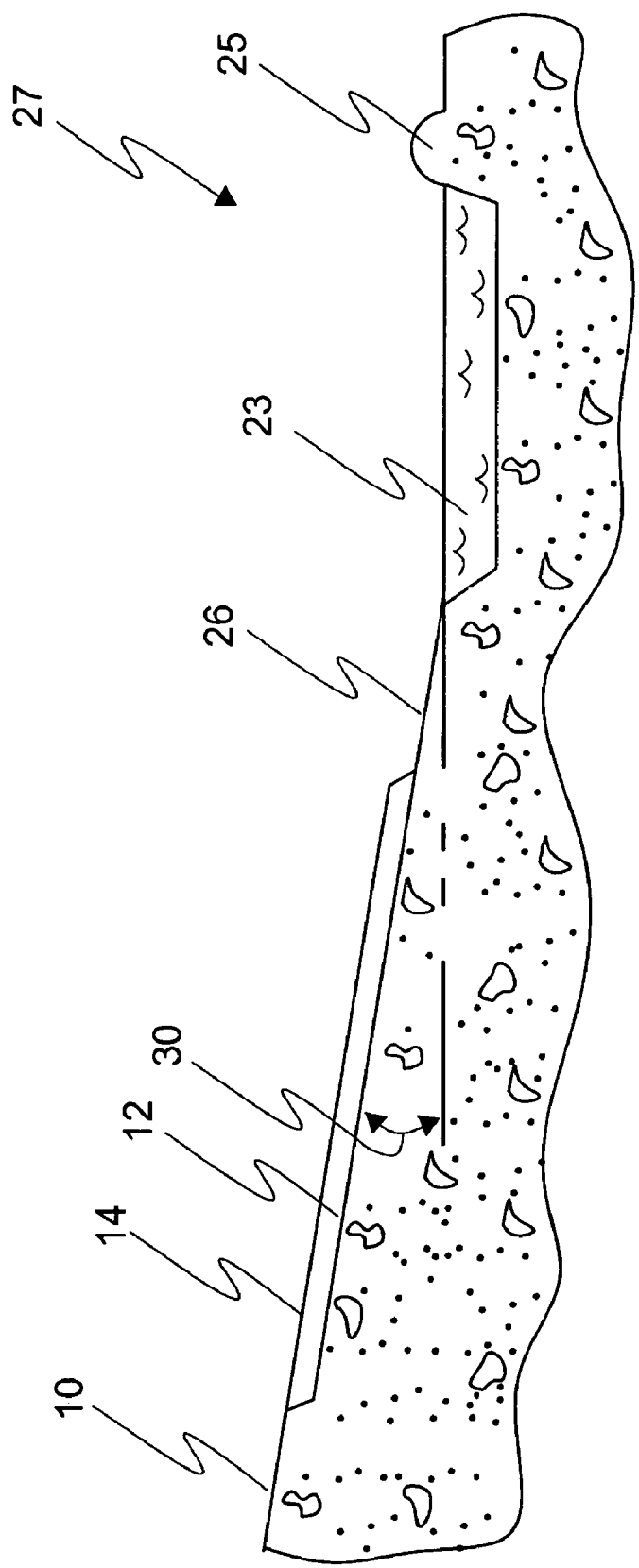
FIG. 3 illustrates a side cross-sectional view of a dairy milking parlor and accompanying lagoon according to one embodiment of the invention.

FIGS. 1-3 illustrate a system configured to introduce microorganisms into a dairy milking parlor and accompanying lagoon according to one embodiment of the invention. There is illustrated an animal production facility that may be a dairy milking parlor, feed parlor, or parlor 20 having an animal entrance/exit 21A wherein animals 18, such as dairy cows 18, may enter or leave the parlor and a waste exit 21B configured to permit the exit of fluid or fluid-like waste material from the parlor 20. For convenience, both feed and milking elements are included in the drawings although typically milking and feeding functions are performed within separate facilities. A parlor floor 10 may be configured to be generally sloping downward towards the waste exit 21B (as generally shown in FIG. 3) to create a natural tendency for fluid waste to travel out of the parlor 20 by way of the waste exit 21B.

Preferably, the dairy milking parlor 20 includes milking apparatus 16 used in extracting milk from animals 18. Also, preferably the parlor 20 includes stalls configured to organize production of the animals 18. In particular, there may be feed troughs 15 configured to be accessed by the animals 18 in each stall through rails 17, wherein the feed troughs 15 may contain animal food 19. Further, the milking apparatus 16 may be configured to extract milk from the animals 18 while the animals 18 are organized in the stalls.

Preferably, there are waste flush alleys 12, or flush alleys, positioned to catch animal waste from each of the stalls as the animals 18 are being processed by the milking apparatus 16. The waste flush alleys 12 may be sloped similarly to the parlor floor 10 and configured to contain fluid waste and direct the fluid waste out of the parlor 20 by way of the waste exit 21B. The flush alleys 12 may run the entire length of the parlor 20 and may be as narrow or wide as is appropriate and as shallow or deep as appropriate. Further, there may be a retaining wall (not shown) defining boundaries of the flush alley 12. Also, there may be grooves (not shown) running the length of the flush alley 12.

Further, there is preferably a parlor cleaning water system configured to provide water for spraying surfaces in the parlor 20, especially the parlor floor 10. There may be hose attachment spigots 22 included in the parlor cleaning water system configured to provide sources of water for a hose 24, which may then be used to distribute water for cleaning the parlor 20. The source of water may be fresh water, for example, for use in cleaning a milking parlor, or may be water from a second lagoon in a multi-stage lagoon system, for example, for use in a feed parlor. Preferably, there is also a microorganism-generation tank 100 in regulatable fluid communication with the parlor cleaning water system, preferably by means of a feed pipe 120. The microorganism-generation tank 100 may be outside the facility or may be enclosed within the facility for protection from the elements. Preferably, there is a lagoon system, or lagoon 27 in general proximity to the parlor 20. Further, it is preferred that the lagoon system 27 be in communication with the parlor 20 such that fluid exiting the parlor may be directed to the lagoon 27. The lagoon 27 provides a reservoir for containing fluid waste during the time required for waste processing. The lagoon system 27 may comprise multiple lagoons 27. For example, there may be a first lagoon configured to break down solid waste and a second lagoon configured to further process the waste and act as a storage lagoon.

Typically the lagoon 27 is usually a 2 lagoon system. The first lagoon processes the waste and the second is for storage and finishing. Most recycled flush water comes from the second lagoon. After being washed down the flush alley 12, wastewater usually goes through a separator that removes most large solids and the removed solids are taken for compost, this removes anywhere from 50% to 80% of the solids. However, some dairies use only one lagoon and others may have three or more lagoons. Lagoon sizes may typically vary between 3 to 15 feet deep and from ½ acre surface to 25 acres. Usually the first lagoon is smaller and between 6 and 10 feet deep, while the second lagoon is larger and deeper for storage purposes.

In operation, the animals 18 are processed, for example milked or fed, in the parlor 20, wherein the animals 18 deposit waste material. The parlor cleaning water system may then be used to spray the surfaces of the parlor 20, in particular the parlor floor and any other desired surfaces, with water. The hose 24 may be attached to the nearest convenient hose attachment spigot 22. The water drawn from the parlor cleaning water system includes material drawn from the microorganism-generation tank by way of the feed pipe 120. Therefore, the water used to clean the parlor 20 may include desired microorganisms at a desired rate. The water washes a majority portion of the animal waste material to the lagoon by way of the parlor floor 10 and flush alleys 12. The parlor floor 10 and/or flush alleys 12 may be configured at an incline 30 to create a tendency for fluids to travel from the parlor 20 to the lagoon 27 by gravity. There may be one or more intermediate areas 26 that may include an area of land or poured concrete 26 that may also be at an incline 30, which incline 30 may or may not be to the same degree as the incline 30 of the parlor floor 10 and/or flush alleys 12. The intermediate areas may further include guiding means 28 such as small concrete lips 28 or raised portions 28 configured to guide fluids towards the lagoon 27. The lagoon 27 may typically comprise a barrier 25 containing the contents of the lagoon 23.

The lagoon 27 may be primarily aerobic, anaerobic, or a combination. Further, the lagoon 27 may be a system of lagoons 27 that may be configured in parallel or in series or in some combination. Further, the lagoon 27 may include any number of devices configured to enhance the operation of the lagoon, including but not limited to aerators, circulators, floating cultures, inlets, outlets, covers, and heaters.

While portions of the animal waste material may remain as coatings on surfaces of the parlor 20, in particular the parlor floor 10, the microorganisms in the water may process the remaining animal waste material and any slime present. Processed animal waste material and processed slime are broken into simpler materials which are typically substantially less likely to adhere to parlor surfaces and is likely to be removed to the lagoon 27 on subsequent washings.

Additionally, as desired microorganisms are carried by the water through the parlor 20 to the lagoon 27, the lagoon 27 is populated with desirable bacteria that may increase the rate at which material in the lagoon 27 is processed. Advantageously, this may allow for faster processing of animal waste material. Further, as processed material may be drawn from the lagoon 27 and distributed to plants, the processed material may contain the desirable microorganisms that may further enhance the growth of vegetation.

The microorganism-generation tank may comprise a container 100 configured to contain liquids, an inlet 110 configured to supply water to the container, a feed pipe 120 configured to permit extraction of bio-liquid material from the container 100, and growth and maintenance apparatus (not shown) configured to promote and/or stimulate growth and reproduction of desired microorganisms. Preferably, the feed pipe 120 will be coupled to the container 100 in a lower portion of the container 100. The growth and maintenance apparatus may include but is not limited to aerators, circulators, temperature regulators, nutrients, nutrient regulators, and nutrient disbursement regulators.

In operation of the microorganism-generation tank, microorganisms are generated, or regenerated, as products and further generations of a biological composition, in a liquid mixture in the container 100. Water is introduced into the container 100 by means of a inlet 110 and bio-liquid material is extracted from the container 100 by means of a feed pipe 120. The feed pipe 120 may extract bio-liquid material from the container 100 as needed. The bio-liquid material, or liquid mixture, may be introduced into the feed pipe 120 at a known rate or may be introduced at known portions per elapsed time. Preferably, the rate at which the bio-liquid material is introduced into the feed pipe 120 does not exceed the rate at which the bio-liquid material is generated by the container 100, which is related to the rate at which water is introduced into the container 100 through the inlet 110.

For example, where the container generates, or regenerates, 100 gallons of liquid mixture per day, it is preferable that the rate at which the liquid mixture is introduced, or injected, into the feed pipe does not exceed 100 gallons per day, regardless of whether the rate is constant throughout a twenty-four hour period. One skilled in the art would understand that typically in animal production, routine processes are developed with generally predictable volume usage of cleaning fluids used in production areas.

In operation, the extracted bio-liquid material may mix with the cleaning water at the junction 140. The mixture ratio may be controlled by controlling the relative feed rates of the cleaning water and the extracted bio-liquid material into the junction 140. The combined cleaning fluid produced at the junction 140 may then pass through pipes 160, which may also travel underground 165. The pipes 160 and 165 may fluidly couple the junction 140 to one or more hose attachment spigots 22, or regulators. One or more hoses 24 may be removably attached to one or more hose attachment spigots 22, thereby fluidly coupling the hose 24 to the junction 140. The hose 24 may then be used to disperse the combined cleaning fluid over surfaces of the parlor 20.

The microorganism-generation tank may beneficially provide a regular supply of desired microorganisms to the parlor cleaning system. In light of this, it is of note that, microorganism generation, and/or regeneration, consumes nutrients. Further, generations of microorganisms tend to mutate, or change, from strains originally introduced. Therefore, preferably, nutrients and original strains of microorganisms are introduced into the container as needed. For example, biological compositions, preferably in pre-made packets including a nutrient quantity and a quantity of original strain(s), or microorganism quantity, are preferably placed within the container on a regular schedule, such as once a week.

In operation of one embodiment, the biological composition may provide a two stage rich source of food and other nutrients for the quantity of microorganisms. The first stage permits rapid reproduction of the microorganism. This beneficially permits the microorganism to predominate other competing microorganisms and creates a large quantity of microorganisms in a short period of time, which then may be dispersed into an animal production facility and/or lagoon. The second stage facilitates maintenance of the microorganism population within the container as portions are extracted and dispersed. During both stages, important nutrients are supplied by the biological composition to the reproducing microorganism population.

Additionally, in operation of one embodiment, the two stage rich source of food is configured to last for a reproduction period, with the materials providing the first stage being substantially consumed before the expiration of the reproduction period. For example, the biological composition may be configured to last for a week, with the first stage configured to be substantially consumed within 48 hours. In another example, the biological composition may be configured to last 4 days, with the first stage configured to be substantially consumed within 24 hours.

One skilled in the art would know that by varying the proportions and total amounts of the materials comprising the ingredients of the two stages and the initial microorganism content of the biological composition, one may adjust the biological composition to generally conform the reproduction period to any reasonable desired period of time. Also, it is not necessary that the reproduction period be known to the manufacturer or that it be designated at all, merely that there be a period of time to which the composition relates as described herein.

Also, in operation of an embodiment, oxygen is introduced to a liquid mixture containing microorganisms in a container. This may be accomplished by injection, bubbling, interface exchange, or any other method known in the art for providing access to oxygen within a liquid. The source of oxygen may be normal air.

Still yet, in operation of one embodiment, portions of a liquid mixture containing microorganisms in a container are extracted from the container. This may be accomplished with an outlet, preferably coupled to a lower portion of the container to avoid clogging with any surface skins formed on a top surface of the liquid mixture in the container.

In addition, the nutrient quantity preferably includes a food source easily utilized by the microorganisms, or short-term nutrient, to promote rapid generation of microorganisms, in particular rapid generation of the original strain. Additionally, the nutrient quantity preferably includes a long lasting food source, or long-term nutrient, configured to nourish the microorganisms after the short-term food source depletes. Also, the nutrient quantity preferably includes a quantity of other nutrients, or supplement nutrients. The nutrient quantity may include but is not limited to vitamins, minerals, enzymes, amino acids, protein compositions, starches, fibers, carbohydrates, sugars, growth media, proteins, chelating agents, complexing agents, sequestering agents, and other materials useful in nourishing microorganisms and plants.

In particular, it is preferred that the microorganism quantity includes a microorganism(s) characterized by the ability to process animal waste, preferably in an animal production facility and/or lagoon. Examples of beneficial microorganisms include but are not limited to bacteria, yeasts, protozoa, actinomycites, and nematodes. It is preferred that the microorganism quantity includes a microorganism(s) characterized by an ability selected from the group consisting of an ability to process nitrogen containing compounds, process phosphorous containing compounds, remove disease-causing organisms from water, facilitate delivery of oxygen to water, convert solid waste to liquid, and benefit any organism characterized by an ability to process nitrogen containing compounds, process phosphorous containing compounds, remove disease-causing organisms from water, facilitate delivery of oxygen to water, and convert solid waste to liquid. Additionally, the microorganisms may be aerobic bacteria. The microorganism(s) may include, but is not limited to bacillus subtilis, bacillus lichenformis, bacillus cereus, bacillus megaterium, fluorescent pseudomonas, azobacter, cellulase enzyme producing bacteria, yeasts, sub-cultures thereof, and combinations thereof.

Still further, it is preferred that the microorganism(s) in the microorganism quantity be included in sufficient quantities to predominate other microorganisms which may use the biological composition to reproduce. "Other microorganisms" as used in the previous sentence may include microorganisms present in a container, in a water supply feeding into a container, strains of similar microorganisms which may have mutated from an original strain related to or identical to the microorganisms present in the microorganism quantity.

Still, in particular, it is preferred that the short-term nutrient include ingredient(s) characterized by the ability to provide a quick and ready source of nourishment for the microorganisms of the microorganism quantity. Preferably, this may include but is not limited to hydrolyzed collagen, bone meal, blood meal, carbon skeleton molecules, sugars, carbohydrates, folvic acid, organic acid, soy protein, peptone treated biological matter (such as peptone treated animal carcasses or peptone treated plant matter), other easily consumed materials and combinations thereof. Preferably, the short-term nutrient is present in the biological composition in sufficient amounts to provide for rapid reproduction of the microorganism quantity and its further generations for a reproduction period.

Further, in particular, it is preferred that the long-term nutrient include ingredients(s) characterized by the ability to provide a stable, lasting (as compared to the short-term nutrient and/or the intended period of replacement of the biological composition packets) source of nourishment for the microorganisms of the microorganism quantity. Preferably, this may include but is not limited to wheat starch, soy flour, molasses, processed or raw animal and/or plant matter, other slowly consumed proteins, fibers, starches, fats and carbohydrates and combinations thereof. Preferably, the long-term nutrient is present in the biological composition in sufficient amounts to provide for continued reproduction of the microorganism quantity and its further generations for a reproduction period after the short term nutrient quantity is substantially consumed.

Again, in particular, it is preferred that the supplement nutrient include ingredient(s) characterized by the ability to provide for the variety of nourishment needs of the microorganisms of the microorganism quantity. It is preferred that the supplement nutrient at least provide for at least one of the non-energy source needs of the microorganisms of the microorganism quantity. Preferably, the ingredient(s) of the supplement nutrient may include but is not limited to food grade proteins; vitamins; inorganic salts; amino acids; growth media; minerals such as phosphate, potassium, calcium, sulfur, cobalt, copper, iron, magnesium, sodium, manganese, and zinc; humate and/or humic acids; enzymes; chelating, complexing, and/or sequestering agents with or without associated molecules; and combinations thereof. Preferably, the supplement nutrient is present in the biological composition in sufficient amounts to nourish the microorganism quantity and its further generations for a reproduction period.

Preferably, the biological composition is in a dry form wherein the biological composition may be stored for a time with the microorganisms in an inactive state. Preferably, the biological composition is a package. Preferably, the biological composition may be powder, granules or a pressed cake. In addition, the biological composition is preferably configured to aid or induce generation or regeneration of a quantity of microorganisms, preferably in a container or system configured to introduce microorganisms into a plant ecosystem. Also, preferably, the biological composition is configured to introduce or reintroduce an early generation of the microorganisms into the container or system. "Early generation" means that the microorganisms are not substantially mutated from the desired species, strains, and/or characteristics.

EXAMPLE ONE

There is a dry organism amount, including a selection of bacteria, in particular bacillus bacteria that is produced by the organization known under the mark "SafeWaze" that is located at 7411 N. Tryon Street in Charlotte, N.C. 28213.

The Bacillus Package, referred to above, includes, but is not limited to specific strains of bacillus including Bacillus Subtilis, Bacilliteniformis, and Bac Megatherium. The microbes are contained in an inert preparation of a natural absorbent which has no chemical impact, combined with powder bran grain as a food source.

There is a dry microorganism amount that includes base soil bacteria, for example, the product known under the brand name Soil Response™. The product known as Soil Response™, is attributed to SafeWaze at 7411 N. Tryon Street in Charlotte, N.C. 28213. The product known as Soil Response™ is a mixture of active hydrocarbon oxidizing, natural single-cell organisms, specifically for use on soil including, but is not limited to Pseudomonas Fluorescent, Azotobacter, as well as Cellulase enzymes producing bacteria. The microorganisms are contained in an inert preparation of a natural absorbent that has no chemical impact.

There is a dry nutrient amount which includes a micronutrient supplement, a long-term food source and a short term food source. The micro-nutrient supplement is manufactured by the organization having the trademark SafeWaze™ at 7411 N. Tryon Street in Charlotte, N.C. 28213. It includes a blend of food grade proteins, vitamins, inorganic salts, and growth media—intended as a supplementary food supply for microorganisms. The micro-nutrient package may include, but is not limited to minerals and nutrients including phosphate, potassium, calcium, sulfur, cobalt, copper, iron, magnesium, and zinc, as well as proteins. The long-term food source is produced under the label DRI-MOL®, which is a dry molasses product manufactured by the organization having the trademark ADM found in Stanley, Wis. 54768. The ingredients include molasses, wheat Starch, calcium strearate, soy flour and lecithin. The short-term food source is hydrolyzed collagen, or HC, of type GCP-1000 which is manufactured by the organization known as Nitta Gelatin NA, INC. at 201 W. Passaic St. in Rochelle Park, N.J. 07662.

The composition amounts are detailed below, with a period of usage of seven days and a fresh clean out at the beginning of each season.

Biological Package Composition and Application Usage:

| | Density | Applied into Container on Days 1, 7, 14, 21 |
| --- | --- | --- |
| *Bacillus* Package | 3.5 ounces/cup | .5 cups |
| Soil Response TM | 6.25 ounces/cup | 0.625 cup |
| Micro-Nutrient Supplement | 6 ounces/cup | 0.125 cups |
| DRI-MOL ® | 5.5 ounces/cup | 2.5 cups |
| Hydrolyzed Collagen HC | 3.25 ounces/cup | 0.75 cups |

EXAMPLE TWO

| | Approximate Percent by Volume |
| --- | --- |
| Dry Bacteria Culture | 5% |
| Yeast | 1% |
| Soybean Protein | 18.75% |
| Nutrient Mineral Mix | 18.75% |
| Humate | 18.75% |
| Granulated Sugar | 18.75% |
| Flour | 18.75% |

The nutrient mineral mix included crude protein, crude fat, salt, calcium, chlorine, magnesium, phosphorous, potassium, sodium, sulfur, cobalt, copper, iodine, iron, manganese, and zinc.

EXAMPLE THREE

Examples of materials which are includable in embodiments include a variety of different biological and food mixes including soy protein use for animal feed supplements, mineral mixes used in animal nutrition, protein packages used in body building and dietary supplement, flours, sugar, raw molasses, yeast, various enzymes used in waste treatment, laundry soaps and the product sold under the mark Oxy Clean. Also included are various combinations of products including the product sold under the marks ViBasic, Xcite and ViPlex from the organization under the mark Vitech Industries. Further examples include the product under the mark Esp333, both liquid and dry, as well as a protein feed supplement from the organization under the mark Bio-Kinetics, soil stimulant from the organization known as Fertile Earth, along with various combinations of fertilizers.

EXAMPLE FOUR

With a three thousand head dairy, having concrete alleys, which are flushed 3 times a day with recycled water out of a second lagoon, the milking parlor is hose washed with fresh water and the cows go through a chemical foot bath prior to milking which is also washed into the lagoon. All flush water goes to a sand separator, then to a transfer basin, pumped to manure separators and then water and smaller solids drain into the first lagoon. It takes approximately 2 to 4 weeks for the waste water to process through the first lagoon. The first lagoon is intended to digest solids. Next the water flows over a weir and into a holding lagoon. In the holding lagoon, the water is used for re-flush water and stored for up to 6 months before being pumped out and dispersed over plants through several irrigation pivots.

A microorganism-generation tank was set up in the utility room of the milking parlor, where fresh water is metered into the tank at a rate of 10 gallons per hour, with an overflow hose leading to a drain that flows to the lagoon. A biological composition with a primary nutrient ingredient produced under the trademark "Bactifeed", is added to the biological tank two times a week.

A crust had formed over the surface of the first lagoon cover approximately 75% of the surface and between 8 to 24 inches thick. After 30 days open surface area over the lagoon had increased to 50%, and within 3 months 80% of the lagoon surface area was open. After treated water flowed into the storage lagoon the dairyman noticed three things. First, water used in re-flush of alleys left very little slime on the concrete making it safer for cows. Second, pivot nozzle clogging was greatly reduced. Third, odor was greatly reduced, especially as noticed by neighbors during pumping through the pivots.

EXAMPLE FIVE

There is a six hundred head dairy having a similar layout to that described in Example Four. The dairy is located within a half mile of town and the odor has been an issue for years. A microorganism-generation tank was started in mid summer with the goal of reducing the odor when they drained the lagoons in the fall to make room for winter storage. Later, after being treated by the issue from the microorganism-generation tank for several months, the lagoon was drained and used as irrigation water. Draining the lagoon and using the liquid as irrigation water typically causes substantial odor that triggers many complaints. In this occasion, there was a noticeable reduction in odor and fewer complaints from the town.

EXAMPLE SIX

There is a farm with 100 milking cows, and 5,000 hogs. The dairy waste is scraped into a holding pit and then shuttled to a lagoon. Waste from the hog pens goes into pits under each hog pen. These pits are drained every two to three weeks into the same lagoon as the dairy waste. At least two problems were addressed by use of a microorganism-generation tank. First, there was a 12 to 24 inch crust covering the entire surface of the lagoon. Second, waste in the hog pits was too viscous to flow easily to the lagoon.

A liquid mixture containing microorganisms was applied to both the hog pits and the dairy holding well on a daily basis. Using several 5-gallon microorganism-generation tanks, a Lagoon composition was mixed with water and let ferment for 24 hours prior to pouring it into the different pits. Regarding the hog pits, application began right after the pits had been emptied and were starting to fill again. When it was time to drain the pits again (3 weeks later) the waste had liquefied to the point that draining them was easier with less scraping and less additional water. The system has continued to improve since. The dairy waste is treated before it is transferred to the waste lagoon. As a result of both treatments the crust on the lagoon is almost completely gone.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Also, although the figures illustrate a particular cleaning system and tank, it is understood that not all details of the configuration and/or conjunction are shown. Also, it is envisioned that the invention may be adapted to couple with any system for dispersing microorganisms into an animal production facility or animal waste lagoon, or that the invention may be an integral part of such system.

Additionally, although the figure and examples illustrate specific compositions, it is understood that the scope of the invention is to be determined by the claims and not by the specific examples.

It is also envisioned that one embodiment may include one material as a short-term nutrient while another may include that same material as a long-term nutrient, depending on the characteristics of the microorganisms in the microorganism quantity and/or the intended period of packet replacement.

One skilled in the art would know that although the invention is sometimes expressed as a mixture of quantities, it is not necessary that the quantities be distinct. For example, the same ingredient forming the short-term nutrient quantity may also supply at least some of the supplement nutrient quantity, as may be the case where a short-term nutrient quantity includes hydrolyzed collagen.

It is expected that there could be numerous variations of the design and/or configuration of embodiments of this invention. An example is that the biological composition may include additional materials beyond those disclosed. These materials may be carrier materials, inert materials, granulation materials, caking materials, or may or may not serve another function such as a beneficial function related to the packaging, shipping, storing, manufacturing, usage, and/or compliance with authority needs.

Finally, it is envisioned that the embodiments of the invention may be constructed of a variety of materials. It is envisioned that the embodiments of the invention may include materials, not herein disclosed but which may be known in the art, having properties substantially similar to those which have been disclosed.

Thus, while the present invention has been fully described above with particularity and detailed in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method of growing microorganisms for processing animal waste, comprising:
   providing a container;
   providing a liquid mixture within the container, wherein the liquid mixture includes:
      a water quantity;
      a microorganism quantity characterized by an ability to process animal waste, wherein the microorganism quantity is a protozoa and subcultures thereof; and
      a nutrient quantity, wherein the nutrient quantity includes:
         a supplement quantity, wherein the supplement quantity is selected from the group consisting of: humates, humic acids, chelating agents, enzymes, complexing agents, sequestering agents, and any combinations thereof;

a short term nutrient configured to promote rapid reproduction of the microorganism quantity, the short term nutrient selected from the group consisting of hydrolyzed collagen, bone meal, blood meal, carbohydrates, folvic acid, organic acid, soy protein, peptone treated biological matter, and combinations thereof;

a long term nutrient configured to be a stable nutrient quantity, the long term nutrient selected from the group consisting of wheat starch, molasses, raw biological matter, and any combinations thereof;

introducing oxygen into the liquid mixture; and circulating the liquid mixture.

2. The method of claim 1, wherein the microorganism quantity further comprises nematodes.

3. The method of claim 1, wherein the microorganism quantity further includes cellulase enzyme producing bacteria.

4. The method of claim 1, further comprising extracting liquid mixture portions from the container at an average rate not greater than an average regenerative rate of the liquid mixture.

5. A method of growing microorganisms for processing animal waste, comprising:

providing a container;

providing a liquid mixture within the container, wherein the liquid mixture includes:

a water quantity;

a microorganism quantity characterized by an ability to process animal waste, wherein the microorganism quantity is a protozoa and subcultures thereof; and a nutrient quantity, wherein the nutrient quantity includes:

a supplement quantity; and a short term nutrient quantity configured to promote rapid reproduction of the microorganism quantity, the short term nutrient selected from the group consisting of: hydrolyzed collagen, bone meal, blood meal, carbohydrates, folvic acid, organic acid, soy protein, peptone treated biological matter, and combinations thereof;

introducing oxygen into the liquid mixture; and circulating the liquid mixture.

6. The method of claim 5, wherein the microorganism quantity further comprises nematodes.

7. The method of claim 5, wherein the microorganism quantity further comprises cellulase enzyme producing bacteria.

8. The method of claim 5, wherein the nutrient quantity further includes a long-term nutrient quantity configured to be a metabolically stable nutrient quantity.

9. The method of claim 7, wherein the long term nutrient quantity is selected from the group consisting of: wheat starch, molasses, raw biological matter, and any combinations thereof.

10. The method of claim 5, wherein the supplement quantity is selected from the group consisting of: humates, humic acids, chelating agents, enzymes, complexing agents, sequestering agents, and any combinations thereof.

11. The method of claim 5, further comprising extracting liquid mixture portions from the container at an average rate not greater than an average regenerative rate of the liquid mixture.

12. A method of growing microorganisms for processing animal waste, comprising:

providing a container;

providing a liquid mixture within the container, wherein the liquid mixture includes:

a water quantity;

a microorganism quantity characterized by an ability to process animal waste, wherein the microorganism quantity is selected from the group consisting of: protozoa, azobacter, cellulase enzyme producing bacteria, yeast, and subcultures thereof; and a nutrient quantity, wherein the nutrient quantity includes:

a supplement quantity, wherein the supplement quantity is selected from the group consisting of: humates, humic acids, chelating agents, enzymes, complexing agents, sequestering agents, and any combinations thereof;

introducing oxygen into the liquid mixture; and circulating the liquid mixture.

13. The method of claim 12, wherein the nutrient quantity further comprises a short term nutrient quantity configured to promote rapid reproduction of the microorganism quantity, wherein the short term nutrient quantity is selected from the group consisting of: hydrolyzed collagen, bone meal, blood meal, carbohydrates, folvic acid, organic acid, soy protein, peptone treated biological matter, and combinations thereof.

14. The method of claim 12, wherein the nutrient quantity further comprises a long term nutrient quantity configured to be a metabolically stable nutrient quantity, wherein the long term nutrient quantity is selected from the group consisting of: wheat starch, molasses, raw biological matter, and any combinations thereof.

15. The method of claim 12, further comprising extracting liquid mixture portions from the container at an average rate not greater than an average regenerative rate of the liquid mixture.

* * * * *